United States Patent [19]

Honjo

[11] Patent Number: 4,908,581

[45] Date of Patent: Mar. 13, 1990

[54] FREQUENCY DEMODULATOR HAVING CIRCUIT CANCELLING UNDESIRED SIGNAL COMPONENTS

[75] Inventor: Masahiro Honjo, Neyagawa, Japan

[73] Assignee: Matsushita Electric Industrial Co., Ltd., Osaka, Japan

[21] Appl. No.: 222,169

[22] Filed: Jul. 21, 1988

[30] Foreign Application Priority Data

Jul. 21, 1987 [JP] Japan .................................. 62-181526
Jul. 21, 1987 [JP] Japan .................................. 62-181529
Aug. 26, 1987 [JP] Japan .................................. 62-212017

[51] Int. Cl.[4] .......................... H04N 5/21; H04N 9/87
[52] U.S. Cl. .................................... 329/320; 329/316; 358/327; 358/328; 358/36; 358/167; 455/305
[58] Field of Search ............... 329/110, 133, 126, 316, 329/320; 358/328, 330, 23, 36, 167, 327; 455/302, 304, 305, 306, 310, 312; 360/30

[56] References Cited

U.S. PATENT DOCUMENTS

| 4,052,740 | 10/1977 | Coleman, Jr. ......................... 360/30 |
| 4,223,282 | 9/1980 | de Boer .................................. 332/10 |
| 4,246,541 | 1/1981 | Ishigaki ........................... 329/133 X |
| 4,291,330 | 9/1981 | Hirai ................................. 358/328 X |
| 4,561,113 | 12/1985 | Naito ............................... 455/312 X |
| 4,597,021 | 6/1986 | Yamamitsu et al. ............. 360/30 X |
| 4,723,175 | 2/1988 | Ishinoi et al. .................. 358/330 X |

FOREIGN PATENT DOCUMENTS 2176367 12/1986 United Kingdom .

*Primary Examiner*—Siegfried H. Grimm
*Attorney, Agent, or Firm*—Wenderoth, Lind & Ponack

[57] ABSTRACT

An FM signal obtained by modulating a carrier $f_c$ with a signal $f_s$ is demodulated by a frequency demodulator to obtain a demodulated signal which contains a lower sideband component as an undesired moire component. A moire component generator generates an $mf_c - nf_s$ component (m and n: natural numbers) from the demodulated signal or generates an $nf_1 - (n-m)f_c$ component ($f_1$: first lower sideband component of the FM signal) from the FM signal. A subtractor subtracts an output of the moire component generator from the demodulated signal so as to thereby eliminate the undesired moire component. Furthermore, to eliminate a cross-modulation moire due to crosstalk of a low-frequency signal $f_L$, the moire component generator generates a $2f_L$ component from the FM signal.

17 Claims, 10 Drawing Sheets

FREQUENCY DEMODULATOR HAVING CIRCUIT CANCELLING UNDESIRED SIGNAL COMPONENTS

BACKGROUND OF THE INVENTION

1. Field of the Invention

This invention relates to a frequency demodulation circuit for demodulating a frequency modulated (FM) signal.

2. Description of the Prior Art

In video tape recorders (VTRs), an FM signal reproduced from a magnetic tape is demodulated by a pulse counting type frequency demodulator which detects zero-crossing points of the FM signal. The demodulated signal obtained by such a frequency demodulator contains the lower sideband components of the FM signal. Among the lower sideband components, components appearing in the base band badly affect the desired signal to cause deterioration of the signal quality. Such undesired components are called "moire" components. As an example, FIG. 13 shows a spectrum diagram of an FM signal obtained by modulating a carrier frequency $f_c$ with a signal frequency $f_s$ and a spectrum diagram of a demodulated signal obtained by demodulating such an FM signal by a double-multiplier pulse counting type demodulator. The lower sideband components $J_{-1}, J_{-2}, J_{-3} \ldots, J_{-n}$ appearing in the demodulated signal are expressed as:

$$J_{-1}=2f_c-f_s, J_{-2}=2f_c-2f_s, J_{-3}=2f_c-3f_s, \ldots,$$
$$J_{-n}=2f_c-nf_s$$

The signal $f_s$ in the base band is obtained by passing the demodulated signal through a low-pass filter (LPF). However, there exist some lower sideband components in the base band as undesired moire components, i.e., the moire components, which degrade the quality of the obtained desired signal. In the case of FIG. 13, the third-order lower sideband component $J_{-3}$ becomes the undesired moire component.

To reduce such an undesired moire effect, the carrier frequency is generally selected to be more than 1.5 times the maximum frequency of the modulation signal. The moire effect can be reduced more by using a higher carrier frequency. However, the higher carrier frequency necessarily results in a lower signal to noise ratio (C/N), and the carrier frequency cannot be made high enough to reduce the moire effect adequately.

In home VTRs, the color-under system is used which converts the frequency of the chrominance signal of the video signal into a lower frequency and mixes the low-converted chrominance signal with the frequency-modulated luminance signal for recording.

Supposing that the carrier frequency is designated as $f_c$ and the down-converted chrominance signal frequency as $f_L$, a cross-modulation component is generated at the frequency of $f_c-2f_L$ during playback due to the frequency characteristics of the electromagnetic conversion system, and a cross-modulation moire component of $2f_L$ is generated in the reproduced luminance signal after demodulation, causing deterioration of the reproduced picture quality.

Conventionally, the recording current of the chrominance signal is restricted to a low level to reduce the level of the cross modulation moire component below the allowable limit, but this causes a deterioration of the S/N of the chrominance signal.

SUMMARY OF THE INVENTION

An object of the present invention is to provide a frequency demodulation circuit which is capable of cancelling moire components generated from the lower sideband components of an FM signal.

Another object of the present invention is to provide a frequency demodulation circuit which is capable of cancelling an undesired cross-modulation moire component generated from a cross-modulation signal contained in an FM signal.

To achieve the above objects, a frequency demodulation circuit of the present invention comprises: a conventional frequency demodulator for demodulating an input FM signal to obtain a demodulated signal; a moire component generator which generates an undesired moire component from either the demodulated signal or the input FM signal; and a subtractor for subtracting the generated undesired moire component from the demodulated signal so as to thereby obtain a demodulated signal from which the undesired moire component is eliminated.

Generally, an FM signal obtained by modulating a carrier frequency $f_c$ with a signal frequency $f_s$ contains an nth-order lower sideband component $f_n=f_c-nf_s$, where n is a natural number. A demodulated signal obtained by demodulating such an FM signal by an m-times-multiplier pulse counting demodulator contains an m-multiplied carrier frequency $mf_c$, where m is a natural number, the signal frequency $f_s$ and an nth-order lower sideband component $J_{-n}=mf_c-nf_s$. This means that the nth-order lower sideband component $J_{-n}$ of the demodulated signal can be calculated as $J_{-n}=mf_c-nf_s$ by using the m-multiplied carrier frequency $mf_c$ and the signal frequency $f_s$ which can be obtained from the demodulated signal.

Alternatively, since the signal frequency $f_s$ is expressed as $f_s=f_c-f_n$, the component $J_{-n}$ can be expressed as $J_{-n}=mf_c-n(f_c-f_n)=nf_n-(n-m)f_c$. This means that the nth-order lower sideband component $J_{-n}$ of the demodulated signal can be calculated as $J_{-n}=nf_n-(n-m)f_c$ by using the carrier frequency $f_c$ and the nth-order lower sideband component $f_n$ of the FM signal.

Therefore, for cancelling an nth-order lower sideband component $J_{-n}$ of the demodulated signal as an undesired moire component, the moire component generator may generate a component of $mf_c-nf_s$ from the demodulated signal or a component of $nf_n-(n-m)f_c$ from the input FM signal.

When a low frequency signal $f_L$ is mixed into the FM signal due to crosstalk, the cross-modulation signal appears at $f_c-2f_L$ in the FM signal. When such FM signal is demodulated the cross-modulation signal appears at $2f_L$ in the demodulated signal as a cross-modulation moire component. To cancel such a cross-modulation moire component, the moire component generator may generate the $2f_L$ frequency component from the input FM signal.

BRIEF DESCRIPTION OF THE DRAWINGS

The above and other objects and features of the invention will be more apparent from the following detailed description of preferred embodiments taken in connection with the accompanying drawings in which.

DESCRIPTION OF THE PREFERRED EMBODIMENTS

First, embodiments for demodulating an FM signal which is obtained by modulating a carrier frequency $f_c$ with a signal frequency $f_s$ will be described.

Figure 1:
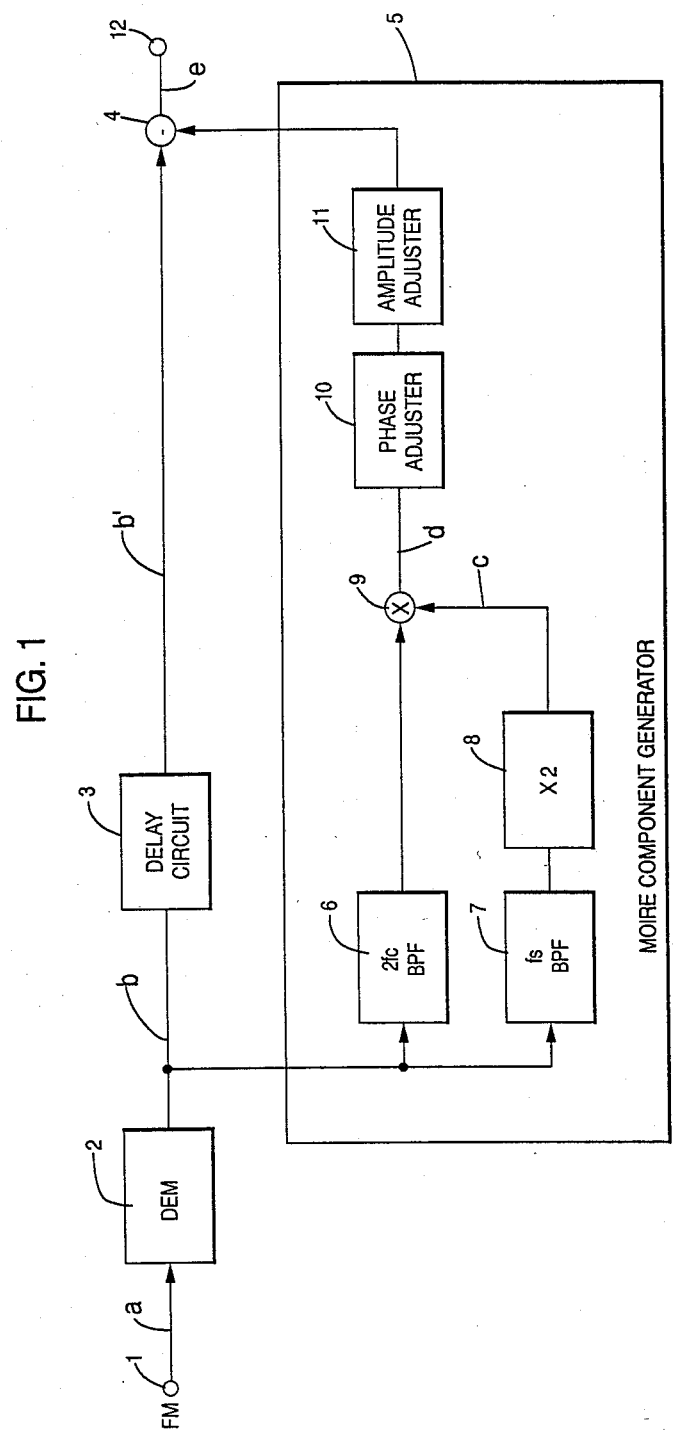
FIG. 1 is a block diagram of a first embodiment of the present invention.
Figure 2:
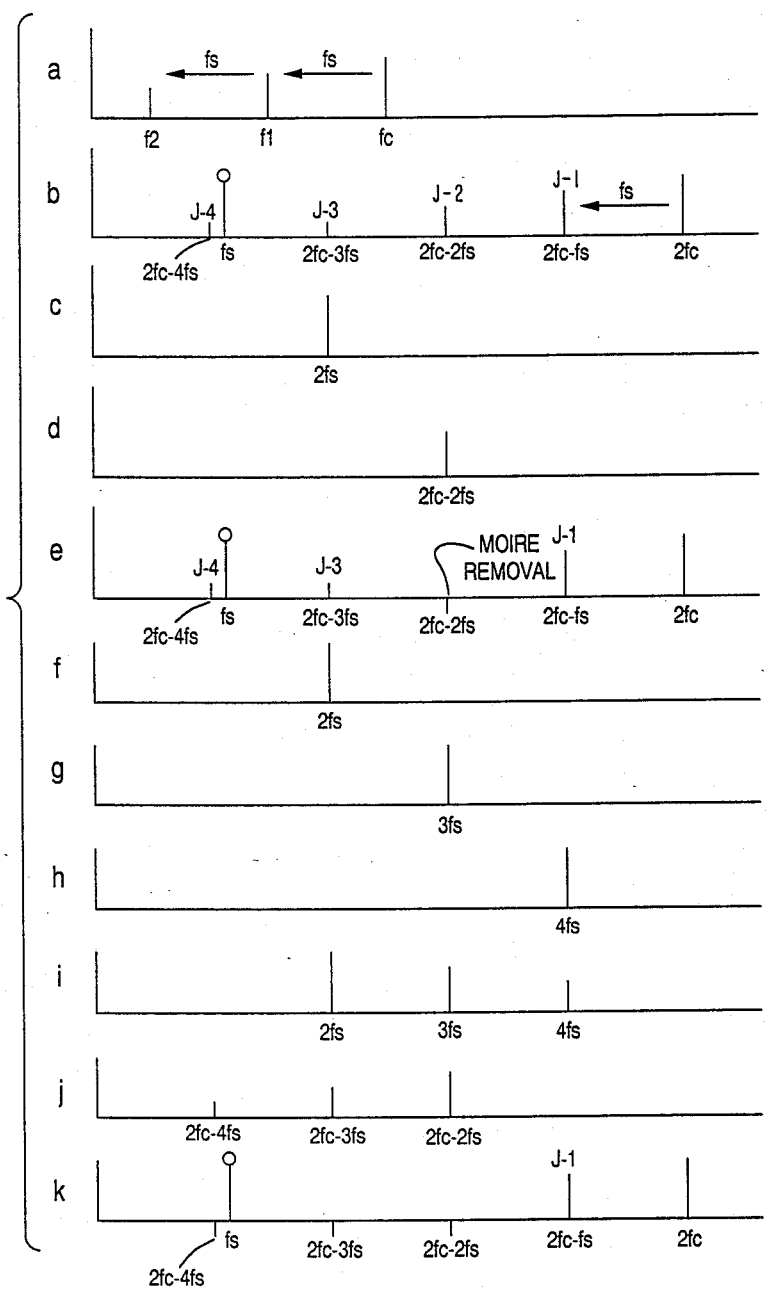
FIG. 2 is a frequency spectrum diagram for explaining a principle of the present invention.

FIG. 1 is a block diagram of a first preferred embodiment of this invention. FIG. 2 shows a spectrum diagram in which a to e correspond to a to e in FIG. 1, respectively.

A FM signal a entering a terminal 1 is demodulated by a known double-multiplier pulse counting demodulator (DEM) 2 to become a signal b. Conventionally, this signal b was the demodulated output signal.

In a moire component generator 5, the $2f_c$ component is separated from the signal b by a band-pass filter (BPF) 6 and fed to a multiplier 9. The $f_s$ component is separated from the signal b by a band-pass filter (BPF) 7, and is doubled by a double-multiplier ($\times 2$) 8 to be $2f_s$. The $2f_s$ component, signal c, is fed to the multiplier 9.

The multiplier 9 multiplies the $2f_c$ component by the $2f_s$ component (signal c) to obtain $2f_c \pm 2f_s$ components (signal d). The signal d is fed to a subtractor 4 through a phase adjuster 10 and an amplitude adjuster 11. The multiplier 9 can be, for example, a known balanced demodulator.

The subtractor 4 subtracts the output signal of the amplitude adjuster 11, which is the output signal of the moire component generator 5, from a signal b' which is obtained by time-adjusting the demodulated signal b by a delay circuit 3, so as to thereby obtain a signal e, which is outputted from an output terminal 12.

As is clear from the spectrum diagram of FIG. 2, the second-order sideband moire component $J_2$ is eliminated from the demodulated signal b. In this embodiment, the delay circuit 3 is not necessarily provided.

Here, if the demodulator 2 is a quadruple-multiplier pulse counting demodulator, the BPF 6 in the moire component generator 5 may be designed to separate the $4f_c$ component from the signal b. In general, if the demodulator 2 is an m (m: natural number)-times-multiplier pulse counting demodulator, the BPF 6 may separate the $mf_c$ component.

Figure 3:
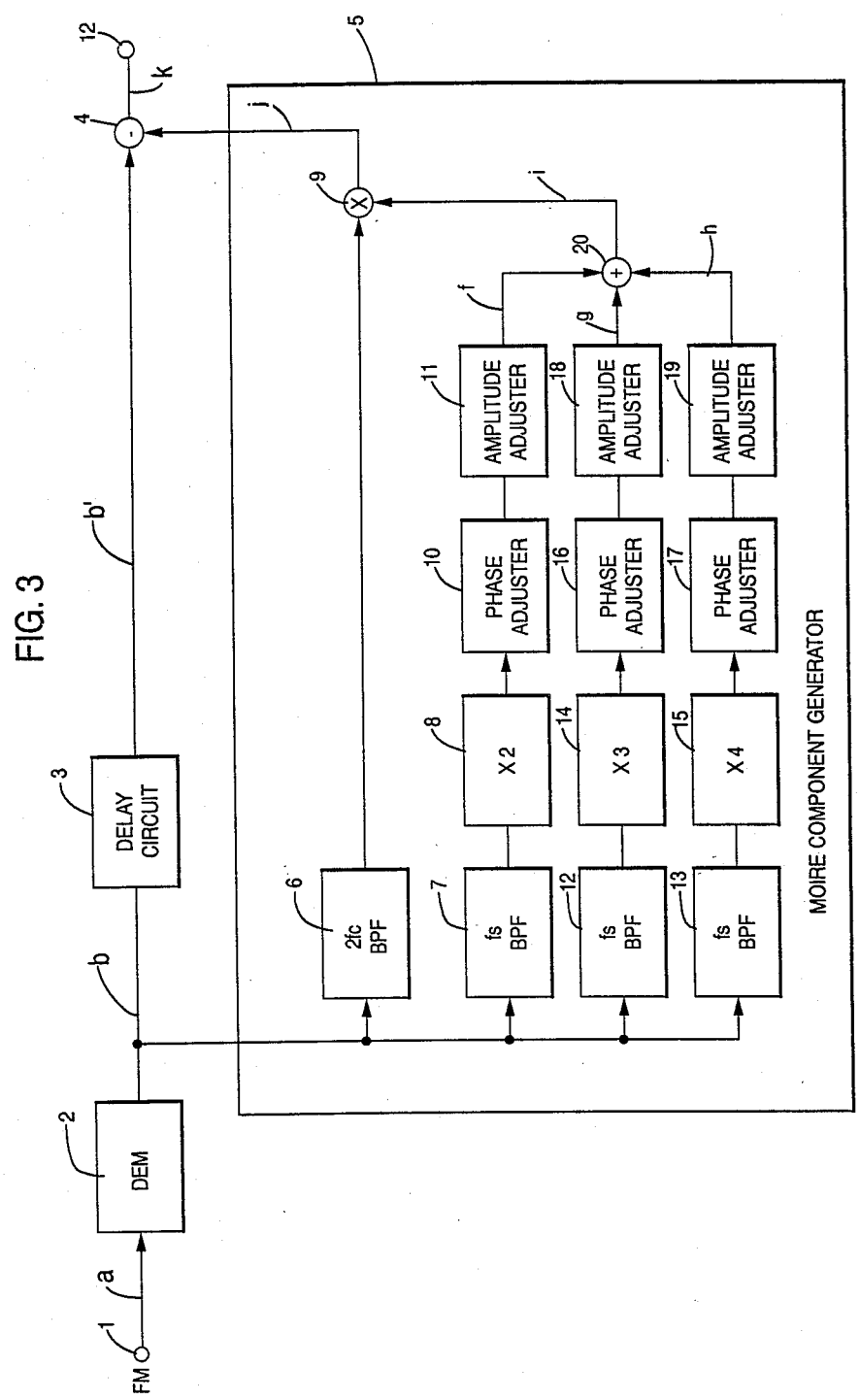
FIG. 3 is a block diagram of a second embodiment of the present invention.

Next, a second preferred embodiment is shown in FIG. 3. The signals at a, b and f to k in FIG. 3 are shown in FIG. 2 as a, b and f to k. To remove moire caused by second to fourth order sideband components, $J_2$ to $J_4$, circuits for extracting the $3f_s$ component and $4f_s$ component are added to the first embodiment. Specifically, the $2f_s$ component is extracted from the demodulated signal b by the BPF 7 and the double-multiplier ($\times 2$) 8 in the same way as described in connection with FIG. 1. Similarly, the $3f_s$ component is obtained by a band-pass filter (BPF) 12 and a treble-multiplier ($\times 3$) 14, and the $4f_s$ component is obtained by a band-pass filter (BPF) 13 and a quadruple-multiplier ($\times 4$) 15. The $2f_s$, $3f_s$ and $4f_s$ components are respectively adjusted in phase and amplitude by a set of a phase adjuster 10 and an amplitude adjuster 11, a set of a phase adjuster 16 and an amplitude adjuster 18 and a set of a phase adjuster 17 and an amplitude adjuster 19 to be signals f, g and h.

The $2f_s$, $3f_s$ and $4f_s$ components f, g and h are added by an adder 20 to obtain a signal i, which is multiplied by the $2f_c$ component by the multiplier 9 to obtain a signal j containing $2f_c \pm 2f_s$, $2f_c \pm 3f_s$ and $2f_c \pm 4f_c$ components. The subtractor 4 subtracts the signal j from the signal b' to obtain a signal k which is a demodulated signal from which the moire components $J_2$, $J_3$ and $J_4$ are eliminated. In the above-mentioned embodiment, a low-pass filter or a band-pass filter may be inserted after the multiplier 9 to feed only the difference signal components, i.e., the moire components, to the subtractor 4.

In the embodiment of FIG. 3, the phase adjusters 10, 16 and 17 and the amplitude adjusters 11, 18 and 19 may be replaced by a set of a phase adjuster and an amplitude adjuster located between the adder 20 and the multiplier 9 or between the multiplier 9 and the subtractor 4. Further, the delay circuit 3 may be omitted.

In general, to remove an nth-order sideband moire component, an n-times-multiplier may be provided for extracting an $nf_s$ component, where n is any integer. Any orders of sideband moire components can be removed by simply modifying the FIG. 3 embodiment.

Figure 4:
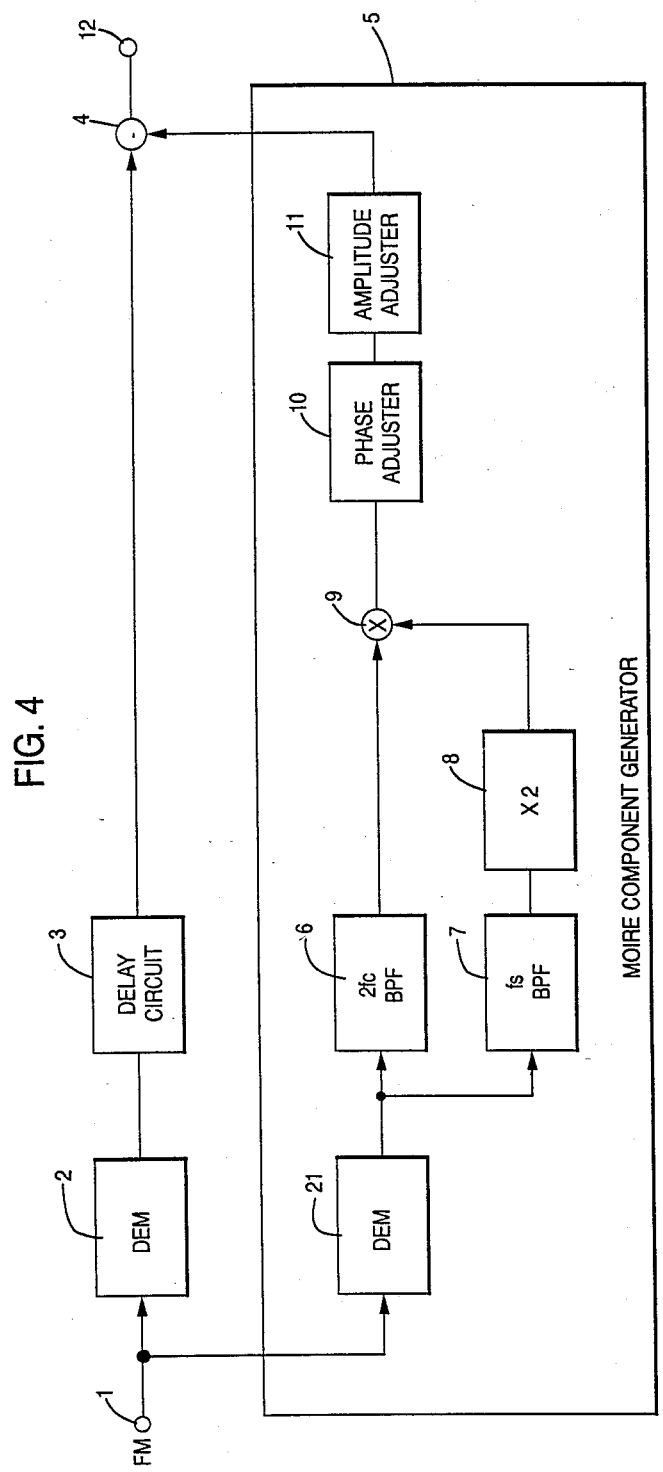
FIG. 4 is a block diagram of a third embodiment of the present invention.

In the above-mentioned embodiments, the moire component generator 5 uses the output of the demodulator 2 as its input signal, but it is possible to use, as the input, the input FM signal a by providing another demodulator separately. One such example is shown in FIG. 4, in which a demodulator 21 is added to the embodiment of FIG. 1. The operation of the embodiment of FIG. 4 is self-explanatory from the foregoing description.

Next, embodiments which generate the moire components from the input FM signal will be described.

Figure 5:
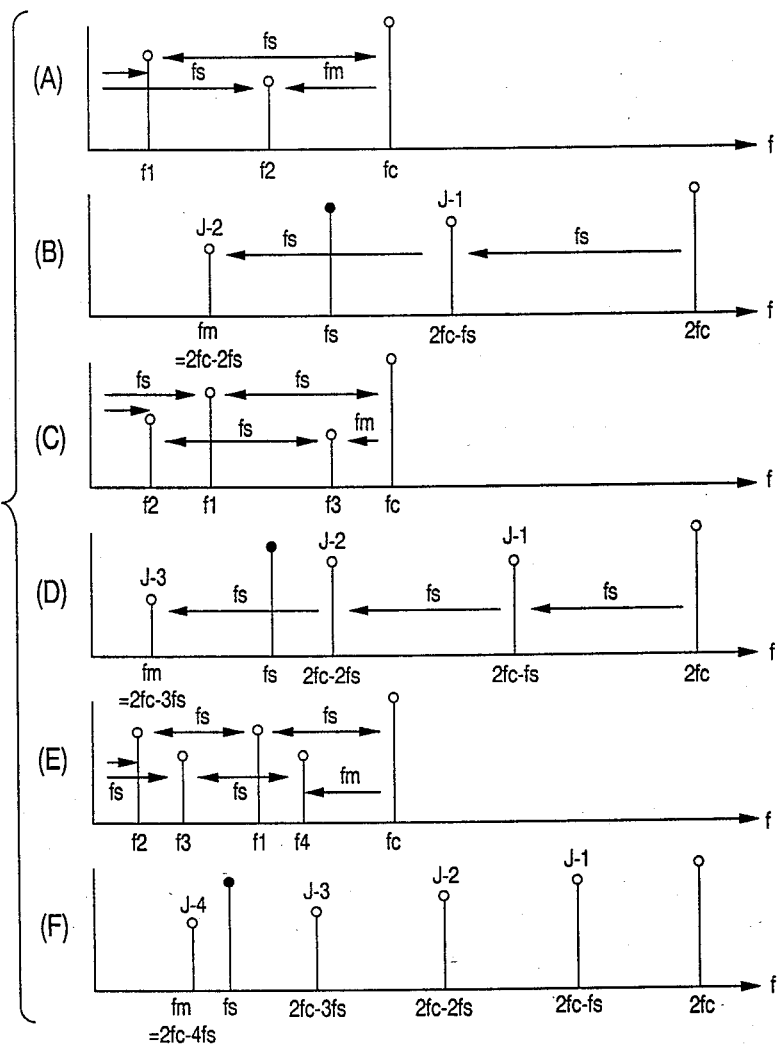
FIG. 5 shows in (A)–(F) frequency spectrum diagrams.

At first, using the spectrum diagram of FIG. 5, the case when the second sideband component causes moire is discussed. When a carrier frequency $f_c$ is modulated with a signal frequency $f_s$, the first lower sideband $f_1$ is generated at $f_1 = f_c - f_s$, and the second lower sideband $f_2$ at $f_2 = f_c - 2f_s = 2f_s - f_c$ as shown in FIG. 5(A). The undesired component $f_m$ caused by $f_2$ after demodulation is generated at $f_m = f_c - f_2 = 2f_1$. This can be interpreted as follows.

The output spectrum of a double-multiplier demodulator is shown in FIG. 5(B). From the doubled component $2f_c$ of the carrier frequency, sidebands $J_{-1}$ and $J_{-2}$ are generated, of which $J_{-2}$ appears in the demodulation band to become an undesired component $f_m$, where $f_m = 2f_c - 2f_s = 2f_1$. That is, the undesired component $f_m$ caused by the second sideband is the doubled component of the first sideband frequency $f_1$ of the FM signal.

Next, the case when the third sideband causes moire is shown in FIGS. 5(C) and 5(D). In this case, FIG. 5(C) is the FM signal spectrum and FIG. 5(D) is the demodulated signal spectrum. The undesired component $f_m$ is generated at $f_m = 2f_c - 3f_s = 3f_1 - f_c$. Then, the case when the fourth sideband causes moire is shown in FIGS. 5(E) and 5(F), where FIG. 5(E) is the FM signal spectrum and FIG. 5(F) is the demodulated signal spectrum. The undesired component $f_m$ is generated at the double frequency component of the FM second sideband, i.e.:

$$f_m = 2f_c - 4f_s$$
$$= 4f_1 - 2f_c$$
$$= 2f_2$$

Generally, a moire component $f_m$ after demodulation caused by an nth sideband is given by $f_m = 2f_c - nf_s = nf_1 - (n-2)f_c$.

Therefore, by producing a component $nf_1 - (n-2)f_c$ from the carrier frequency $f_c$ and the first sideband frequency $f_1$ and subtracting the $nf_1 - (n-2)f_c$ component from the demodulated signal, the moire component $f_m$ can be completely canceled.

Figure 6:
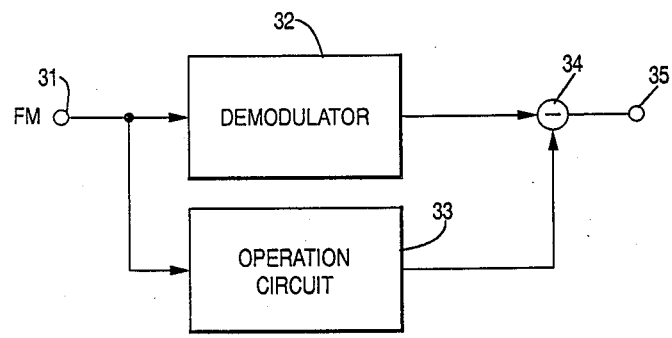
FIG. 6 is a block diagram of a fourth embodiment of the present invention.

FIG. 6 shows a block diagram of a fourth preferred embodiment of the present invention. An FM signal fed into an input terminal 31 is demodulated by a known pulse counting demodulator 32. An operation circuit 33 produces moire components from the FM signal according to the above-described calculation. A subtractor 34 subtracts the moire components produced by the operation circuit 33 from the demodulated signal so as to thereby obtain a demodulated signal from which the moire components are eliminated and which is outputted from an output terminal 35.

Figure 7A:
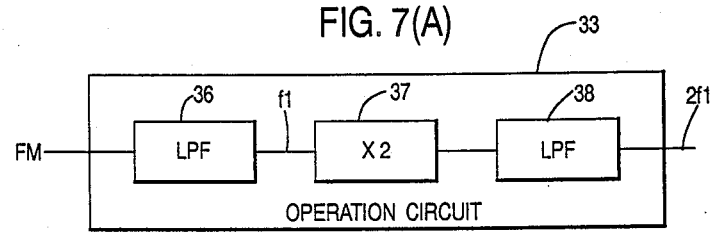
FIGS. 7(A) and 7(B) are block diagrams of the operation circuit shown in FIG. 6.
Figure 7B:
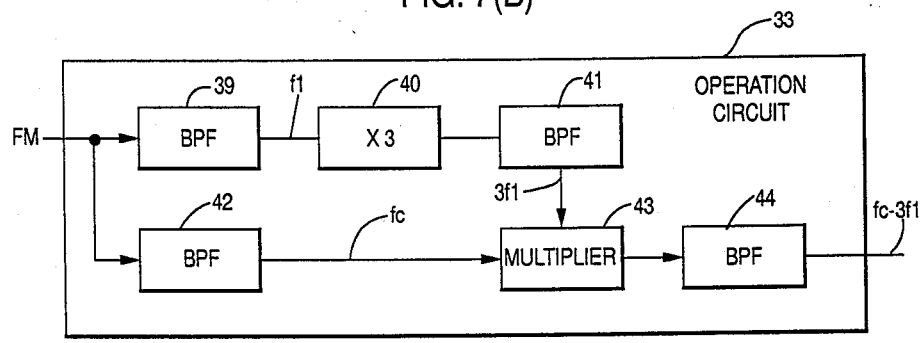

Next, FIGS. 7 (A) and 7 (B) show examples of the operation circuit 33. FIG. 7 (A) shows an operation circuit which produces the second-order moire. The first lower sideband $f_1$ of the FM signal is allowed to pass through a low-pass filter (LPF) 36 and is doubled by a double-multiplier (×2) 37. Then, the doubled component $2f_1$ is allowed to pass through a low-pass filter (LPF) 38.

FIG. 7 (B) shows an operation circuit which produces the third order moire. The first lower sideband $f_1$ is allowed to pass through a band-pass filter (BPF) 39 and is then trebled by a triple-multiplier (×3) 40. The trebled component $3f_1$ is allowed to pass through a band-pass filter (BPF) 41 and is then fed to a multiplier 43. The carrier frequency $f_c$ is allowed to pass through a band-pass filter (BPF) 42 and is then fed to the multiplier 43. The multiplier 43 multiplies the $f_c$ component by the $3f_1$ component to obtain the $f_c \pm 3f_1$ components. The $f_c - 3f_1$ component is allowed to pass through a band-pass filter (BPF) 44.

Figure 8:
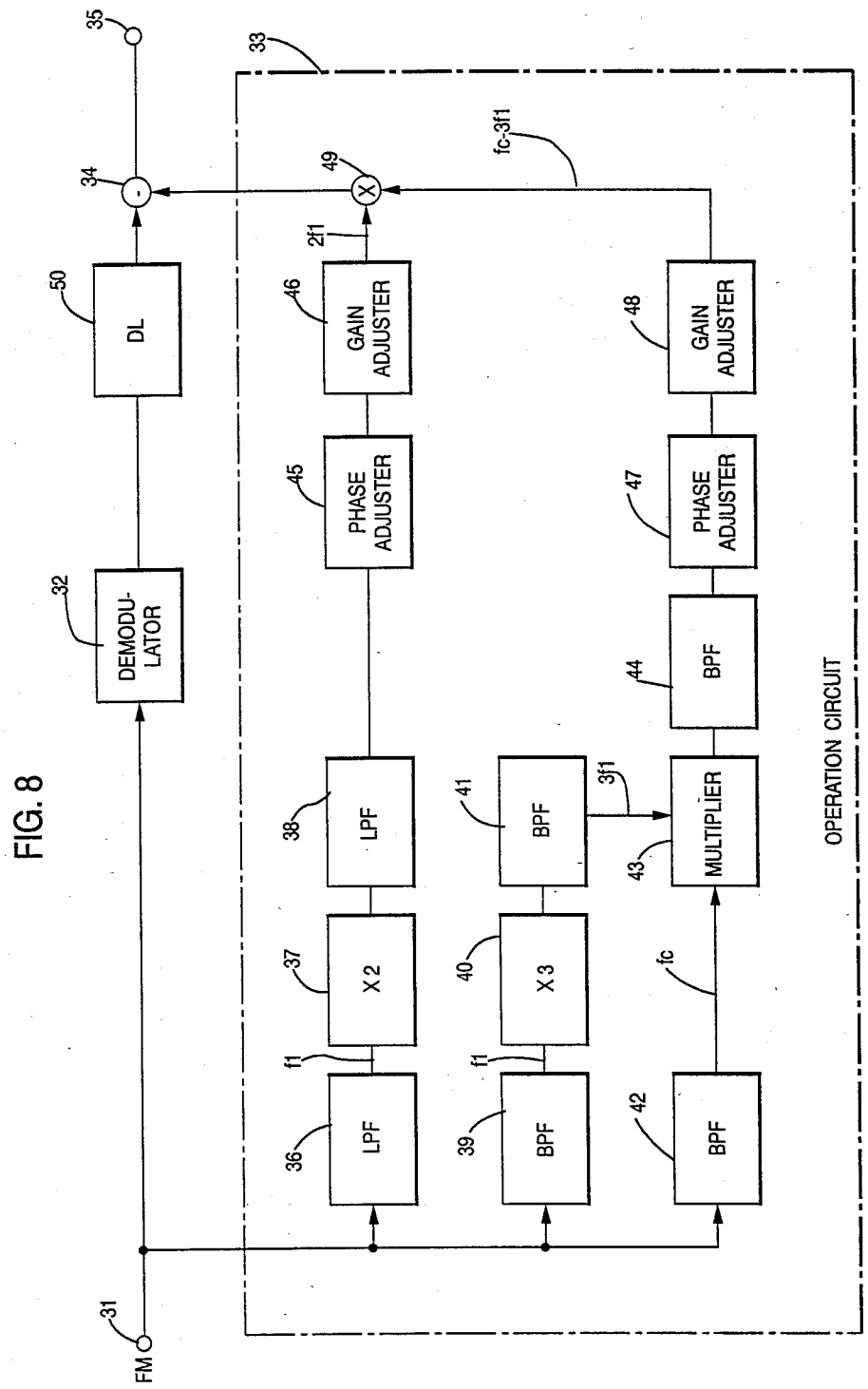
FIG. 8 is a block diagram of a fifth embodiment of the present invention.

FIG. 8 is a block diagram of a fifth embodiment summarizing FIGS. 6 and 7. In FIG. 8, phase adjusters 45 and 47 and gain adjusters 46 and 48 adjust phase and gain respectively so that moire can be canceled in the most effective way by the subtractor 34. However, they can be omitted. A delay circuit (DL) 50 compensates for the time delay of the operation circuit 33 and this can be also omitted. The multiplier 43 comprises a known balanced modulator or the like. An adder 49 adds the second and third order moire components, but is not inherent to the present invention. BPFs 39, 41, and 44 may be low-pass filters, and LPFs 36 and 38 may be band-pass filters. The double-multiplier 37 comprises a known balanced modulator or the like. The triple-multiplier 40 may limit the input signal and generates the third harmonic.

Figure 9:
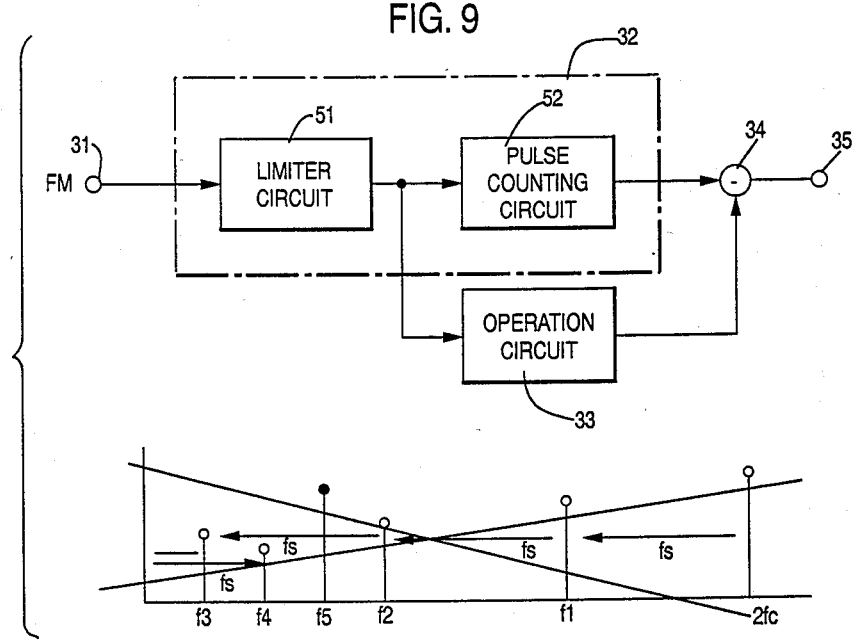
FIG. 9 is a block diagram of a sixth embodiment of the present invention.

The demodulator 32 usually has a limiter circuit at the primary stage. The output signal of this limiter circuit may be fed to the operation circuit 33, as shown in FIG. 9. The demodulator 32 comprises a limiter circuit 51 and a pulse counter 52. The output signal of the limiter circuit 51 is fed to the operation circuit 33. In such a case, the amplitude flunctuation of the input FM signal is removed by the limiter circuit 51, and the limiter circuit makes the lower sideband and upper sideband levels constant, thereby improving accuracy to cancel moire.

Next an embodiment for cancelling cross-modulation moire will be described.

Figure 10A:
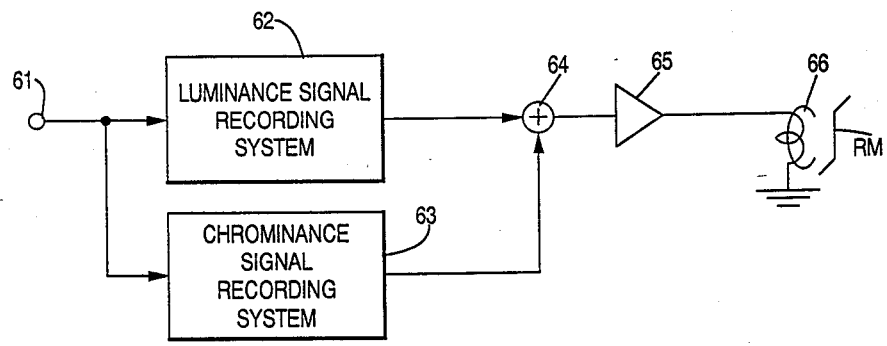
FIGS. 10(A) and 10(B) are block diagrams of a seventh embodiment of the present invention.
Figure 10B:
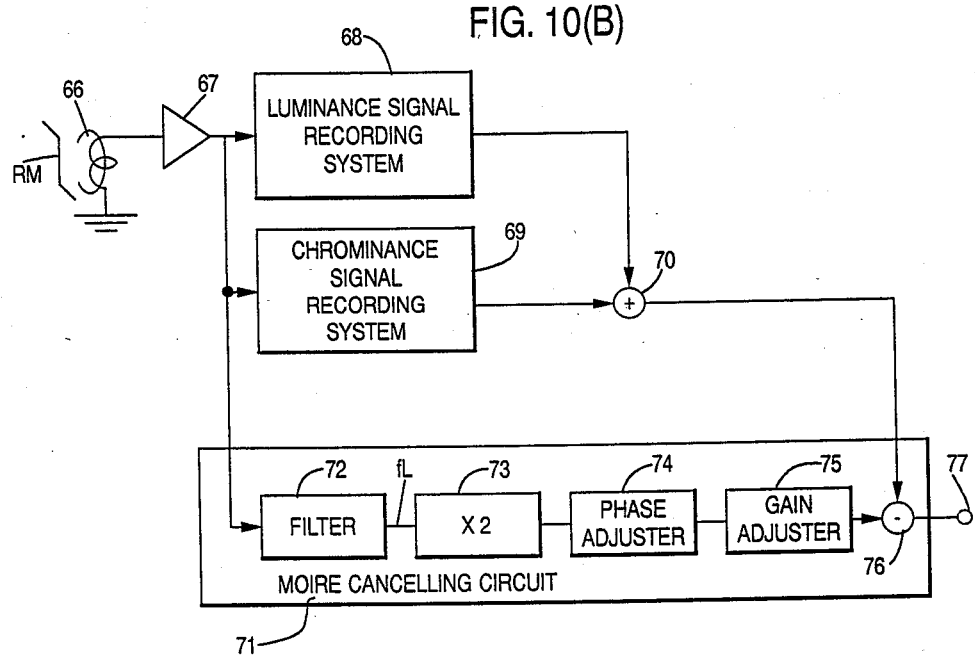
Figure 12:
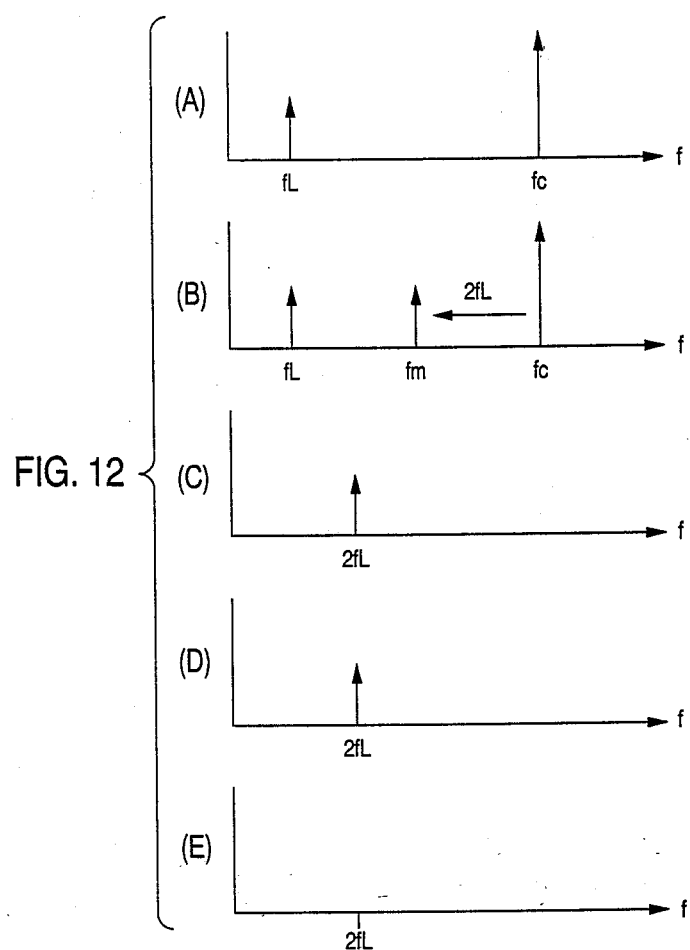
FIG. 12 shows in (A)–(E) frequency spectrum diagrams for explaining the principle of the FIGS. 10(A)–10(B) and 11 embodiments.
Figure 13:
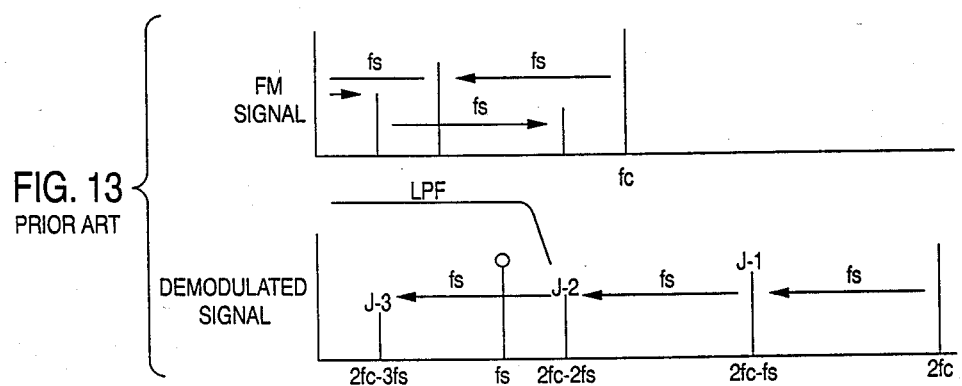
FIG. 13 is a frequency spectrum diagram of a conventional example.

FIGS. 10(A) and 10(B) are block diagrams of a seventh preferred embodiment which is a color-under magnetic recording and reproducing system of a video signal. A video signal inputted via a terminal 61 is fed to both a luminance signal recording system 62 and a chrominance signal recording system 63. The luminance signal recording system 62 extracts a luminance signal from the video signal and frequency-modulates the luminance signal to obtain a FM luminance signal in a known manner. The chrominance signal recording system 63 extracts a chrominance signal from the video signal and converts the frequency of the chrominance signal to a low frequency to obtain a down-converted chrominance signal in a known manner. An adder 64 adds the FM luminance and down-converted chrominance signals to obtain a recordable video signal. This recordable video signal is amplified by an amplifier 65 and recorded by a magnetic head 66 on a magnetic recording medium RM such as a magnetic tape.

The recorded video signal is reproduced by the head 66, amplified by an amplifier 67 and fed to a luminance signal reproducing system 68, a chrominance signal reproducing system 69 and a moire canceling circuit 71. The luminance signal reproducing system 68 extracts the FM luminance signal from the reproduced video signal and demodulates the FM luminance signal to obtain a reproduced luminance signal. The chrominance signal reproducing system 69 extracts the down-converted chrominance signal from the reproduced video signal and converts the frequency of the down-converted chrominance signal to the normal high frequency to obtain a reproduced chrominance signal. An adder 70 adds the reproduced luminance and chrominance signals to obtain a reproduced composite video signal, which usually contains as an undesired cross-modulation moire component, the component of $2f_L$, where $f_L$ is the frequency of the down-converted chrominance signal. This cross-modulation moire is generated in the luminance signal reproducing system 68.

That is, the down-converted chrominance signal $f_L$ is mixed, as a cross-modulation component, into the FM luminance signal when the video signal is reproduced from the recording medium due to the frequency characteristics of the electromagnetic conversion system comprising the recording medium RM and the magnetic head 66. This cross-modulation component becomes the cross-modulation moire component when the FM luminance signal is demodulated.

The moire canceling circuit 71 cancels the cross-modulation moire $2f_L$. The reproduced signal from the amplifier 67 is inputted to a filter 72 which separates the down-converted chrominance signal $f_L$. Either a low-pass filter or a band-pass filter may be used for the filter 72. The output of the filter 72 is fed to a double-multiplier ($\times 2$) 73. The double-multiplier 73 doubles the frequency $f_L$ to obtain the $2f_L$ component. The $2f_L$ component has its phase and gain adjusted by a phase adjuster 74 and a gain adjuster 75, and then is fed to a subtractor 76. The subtractor subtracts the $2f_L$ component from the reproduced composite video signal outputted from the adder 70 so as to thereby obtain a video signal from which the cross-modulation moire $2f_L$ is eliminated and which is outputted from an output terminal 77.

In this embodiment, the subtractor 76 may not be necessarily positioned after the adder 70, but it may be located at any place after a frequency demodulator located in the luminance signal reproducing system 68.

Figure 11:
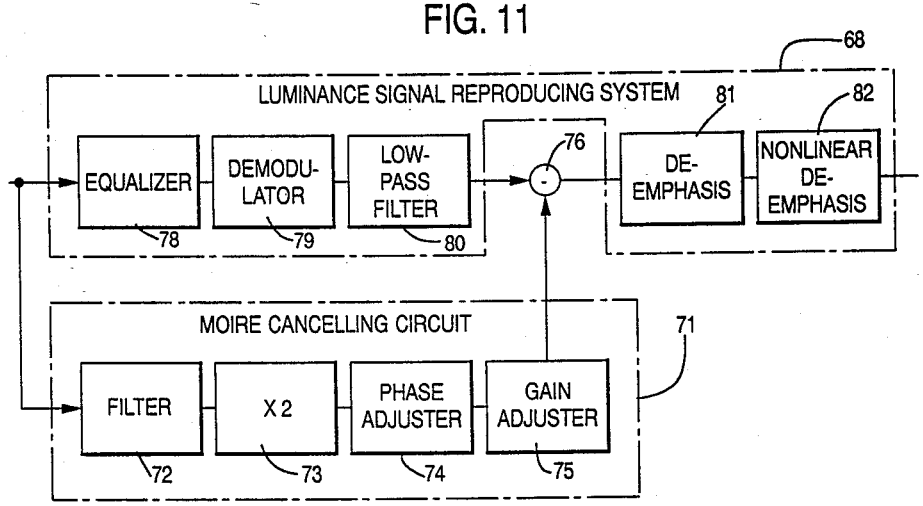
FIG. 11 is a block diagram of an eighth embodiment of the present invention.

FIG. 11 shows a block diagram of an eighth preferred embodiment which is a modification of the FIGS. 10(A)-10(B) embodiment in that the subtractor 76 is positioned in the luminance signal reproducing system 68. The luminance signal reproducing system 68 separates the FM luminance signal from the reproduced video signal, and comprises an equalizer 78 that compensates for the frequency characteristics, a demodulator 79 that demodulates the equalizer output, a low-pass filter 80 that separates signal components from the demodulator output, a de-emphasis circuit 81, and a nonlinear de-emphasis circuit 82. The subtractor 76 is inserted between the low-pass filter 80 and the de-emphasis circuit 81. This configuration provides a benefit of reducing noise components leaking from the moire canceling circuit 71 by the de-emphasis circuit 81 and the nonlinear de-emphasis circuit 82.

FIGS. 12(A)-12(E) show frequency spectrum diagrams for explaining the operation of the FIGS. 10(A)-10(B) or FIG. 11 embodiments. The signal containing the carrier frequency $f_c$ of the FM luminance signal and the down-converted chrominance signal frequency $f_L$ as shown in FIG. 12 (A) is recorded. Passing such a signal through the electromagnetic conversion system (i.e., the head and recording medium) causes $f_m = f_c - 2f_L$ to be generated as shown in FIG. 12 (B). Demodulating in the luminance signal reproducing system causes the $f_m$ component to be the cross modulation moire of $2f_L$ as shown in FIG. 12 (C). On the other hand, the $2f_L$ component is produced by the moire canceling circuit as shown in FIG. 12 (D). Subtracting the spectrum of FIG. 12 (D) from that of FIG. 12 (C) cancels the moire as shown in FIG. 12 (E).

In the above embodiments, the frequency $f_L$ component is the down-converted chrominance signal, but the present invention is not limited only to such a signal. For example, signals obtained by line-sequentially frequency-modulated chrominance signals, such as R-Y, B-Y, or I and Q signals, or signals obtained by time-compressing and frequency-modulating chrominance difference signals may be used.

The double multiplier circuit 73 can be easily constructed by a known balanced demodulator and a filter that separates the doubled components. The phase adjuster 74 and gain adjuster 75 can be omitted.

What is claimed is:
1. A frequency demodulation apparatus for demodulating a frequency-modulated signal obtained by modulating a carrier frequency $f_c$ with a signal frequency $f_s$, comprising:
   a demodulating means for demodulating the frequency-modulated signal to obtain a demodulated signal which contains an m-times-multiplied carrier frequency $mf_c$, where m is a natural number, the signal frequency $f_s$ and an nth-order lower sideband component $mf_c - nf_s$ as an undesired moire component, where n is a natural number;
   a moire component generating means for extracting the carrier frequency $mf_c$ and the signal frequency $f_s$ from the demodulated signal and for generating a moire component $mf_c - nf_s$ corresponding to said undesired moire component; and
   a subtracting means for subtracting the moire component generated by said moire component generating means from said demodulated signal so as to thereby obtain a demodulated signal from which said undesired moire component is eliminated.

2. A frequency demodulation apparatus as in claim 1, wherein said moire component generating means comprises:
   a first filter means coupled to said demodulating means for passing the carrier frequency $mf_c$;
   a second filter means coupled to said demodulating means for passing the signal frequency $f_s$;
   an n-times-multiplying means for multiplying the signal frequency $f_s$ from said second filter means by n to obtain the frequency component $nf_s$; and
   a multiplying means for multiplying the carrier frequency $mf_c$ from said first filter means and the frequency $nf_s$ from said n-times-multiplying means so as to thereby obtain the moire component $mf_c - nf_s$.

3. A frequency demodulation apparatus as in claim 1, wherein said moire component generating means includes means for adjusting the gain and amplitude of the generated moire component.

4. A frequency demodulation apparatus as in claim 1, further comprising a delay means provided between said demodulating means and said subtracting means for compensating for a time delay caused in said moire component generating means.

5. A frequency demodulation apparatus for demodulating a frequency-modulated signal obtained by modulating a carrier frequency $f_c$ with a signal frequency $f_s$, comprising:
   a demodulating means for demodulating the frequency-modulated signal to obtain a demodulated signal which contains an m-times-multiplied carrier frequency $mf_c$, which m is a natural number, the signal frequency $f_s$ and second order through nth-order lower sideband components $mf_c - 2f_s$ through $mf_c - nf_s$ as undesired moire components, where n is a natural number larger than 2;
   a moire component generating means which comprises: a first filter means for extracting the carrier frequency $mf_c$ from the demodulated signal; a second filter means for extracting the signal frequency $f_s$ from the demodulated signal; a first multiplying means for multiplying the extracted signal frequency $f_s$ by two through n, respectively, to obtain $2f_s$ through $nf_s$ frequency components; an adding means for adding the $2f_s$ through $nf_s$ components from said first multiplying means; and a second multiplying means for multiplying the carrier frequency $mf_c$ and the added result from the adding means so as to thereby obtain second through nth-order moire components $mf_c-2f_s$ through $mf_c-nf_s$ corresponding to said undesired moire components; and a subtracting means for subtracting the moire components generated by said moire component generating means from the demodulated signal so as to thereby obtain a demodulated signal from which said undesired moire components are eliminated.

6. A frequency demodulation apparatus for demodulating a frequency-modulated signal which is obtained by modulating a carrier frequency $f_c$ with a signal frequency $f_s$, comprising:

a demodulating means for demodulating the frequency-modulated signal to obtain a demodulated signal which contains an m-times-multiplied carrier frequency $mf_c$, where m is a natural number, the signal frequency $f_s$ and an nth-order lower sideband component $nf_1-(n-m)f_c$ as an undesired moire component, where n is a natural number and $f_1$ is a first-order lower sideband component, expressed as $f_1=f_c-f_s$, of the frequency-modulated signal;

a moire component generating means for extracting the carrier frequency $f_c$ and the first-order lower sideband component $f_1$ from the frequency-modulated signal and for generating a moire component $nf_1-(n-m)f_c$ corresponding to said undesired moire component; and a subtracting means for subtracting the moire component generated by the moire component generating means from the demodulated signal so as to thereby obtain a demodulated signal from which said undesired moire component is eliminated.

7. A frequency demodulation apparatus as in claim 6, wherein m=2 and n=2, and wherein said moire component generating means comprises: a filter means for extracting the first-order lower sideband component $f_1$ from the frequency-modulated signal; and a multiplying means for multiplying the extracted component $f_1$ by 2 so as to thereby obtain a component $2f_1$ as the moire component.

8. A frequency demodulation apparatus as in claim 6, wherein m=2 and n=3, and wherein said moire component generating means comprises: a first filter means for extracting the carrier frequency $f_c$ from the frequency-modulated signal; a second filter means for extracting the first-order lower sideband component $f_1$ from the frequency-modulated signal; a first multiplying means for multiplying the extracted component $f_1$ by 3 to obtain a $3f_1$ component; and a second multiplying means for multiplying the extracted carrier frequency $f_c$ and the $3f_1$ component so as to thereby obtain a component $f_c-3f_1$ as the moire component.

9. A frequency demodulation apparatus as in claim 6, wherein said moire component generating means includes means for adjusting the phase and amplitude of the generated moire component.

10. A frequency demodulation apparatus as in claim 6, further comprising a delay means provided between said demodulating means and said subtracting means for compensating for a time delay caused in said moire component generating means.

11. A frequency demodulation apparatus for demodulating a frequency-modulated signal which has a carrier frequency $f_c$ and contains a low-frequency signal $f_L$ and a cross-modulation signal component expressed as $f_c-2f_L$, comprising:

a demodulating means for demodulating the frequency-modulated signal to obtain a demodulated signal which contains a frequency component $2f_L$ as an undesired cross-modulation moire component;

a moire component generating means for extracting the low-frequency signal $f_L$ from the frequency-modulated signal and for generating a $2f_L$ component as a moire component corresponding to said undesired cross-modulation moire component; and a subtracting means for subtracting the moire component generated by said moire component generating means from the demodulated signal so as to thereby obtain a demodulated signal from which said undesired cross-modulation moire component has been eliminated.

12. A frequency demodulation apparatus as in claim 11, wherein said moire component generating means comprises: a filter means for extracting the low-frequency signal $f_L$ from the frequency-modulated signal and a multiplying means for multiplying the extracted signal $f_L$ by 2 so as to thereby obtain the $2f_L$ component.

13. A frequency demodulation apparatus as in claim 11, wherein said moire component generating means includes means for adjusting the gain and amplitude of the generated moire component.

14. A signal recording and reproducing apparatus comprising:

a means for extracting a first signal from an input signal and frequency-modulating a carrier frequency $f_c$ with the first signal to obtain a frequency-modulated signal;

a means for extracting a second signal from the input signal and for generating from the second signal a low-frequency signal $f_L$;

a means for adding the frequency-modulated signal and the low-frequency signal to obtain a recording signal;

a means for recording the recording signal on a recording medium and reproducing the recorded signal from the recording medium, the reproduced signal containing a reproduced low-frequency signal and a reproduced frequency-modulated signal which contains a component $f_c-2f_L$ as a cross-modulation component;

a means for extracting the reproduced frequency-modulated signal from the reproduced signal and demodulating the extracted signal to obtain a reproduced first signal which contains a component $2f_L$ as an undesired cross-modulation moire component;

a means for generating a reproduced second signal from the reproduced low-frequency signal;

a means for adding the reproduced first and second signals to obtain a reproduced signal;

a moire component generating means for extracting the low-frequency signal $f_L$ from the reproduced signal reproduced from the recording medium and for generating a moire component $2f_L$ corresponding to said undesired cross-modulation moire component; and a subtracting means for subtracting the moire component generated by said moire component generating means from the reproduced signal so as to thereby obtain a reproduced signal from which said undesired cross-modulation moire component is eliminated.

15. An apparatus as in claim 14, wherein said input signal is a video signal, and said first and second signals are a luminance signal and a chrominance signal, respectively.

16. A signal recording and reproducing apparatus comprising:
- a means for extracting a first signal from an input signal and frequency-modulating a carrier frequency $f_c$ with the first signal to obtain a frequency-modulated signal;
- a means for extracting a second signal from the input signal and for generating from the second signal a low-frequency signal $f_L$;
- a means for adding the frequency-modulated signal and the low-frequency signal to obtain a recording signal;
- a means for recording the recording signal on a recording medium and reproducing the recorded signal from the recording medium, the reproduced signal containing a reproduced low-frequency signal and a reproduced frequency-modulated signal which contains a component $f_c-2f_L$ as a cross-modulation component;
- a means for extracting the reproduced frequency-modulated signal from the reproduced signal and demodulating the extracted signal to obtain a reproduced first signal which contains a component $2f_L$ as an undesired cross-modulation moire component;
- a means for generating a reproduced second signal from the reproduced low-frequency signal;
- a means for adding the reproduced first and second signals to obtain a reproduced signal;
- a moire component generating means for extracting the low-frequency signal $f_L$ from the reproduced signal reproduced from the recording medium and for generating a moire component $2f_L$ corresponding to said undesired cross-modulation moire component; and
- a subtracting means for subtracting the moire component generated by said moire component generating means from the reproduced second signal so as to thereby obtain a reproduced signal from which said undesired cross-modulation moire component is eliminated.

17. An apparatus as in claim 16, wherein said input signal is a video signal, and said first and second signals are a luminance signal and a chrominance signal, respectively.

* * * * *